United States Patent Office 2,785,192
Patented Mar. 12, 1957

2,785,192
METHOD OF PREPARATION OF TRIETHANOL-
AMINE BORATE

Irving N. Elbling and Stanley H. Langer, Pittsburgh, Pa.,
assignors to Westinghouse Electric Corporation, East
Pittsburgh, Pa., a corporation of Pennsylvania No Drawing. Application February 4, 1955,
Serial No. 486,278

7 Claims. (Cl. 260—462)

The present invention relates to a process for the preparation of triethanolamine borate in quantity with a high yield and of excellent purity.

Triethanolamine borate is of interest in industry because of its demonstrated effectiveness as a curing or hardening agent for glycidyl polyethers, also known as epoxy resins. Such resins, when cured with triethanolamine borate, have excellent chemical stability, high resistance to moisture premeability, low electrical losses, and superior adhesive qualities all of which render the same particularly useful as surface coating materials, casting resins and adhesive compounds.

One known method for preparing triethanolamine borate comprises esterifying boric acid and triethanolamine by heating and reacting the same under vacuum for periods of about 10 hours followed by recrystallization from acetonitrile or sublimation under vacuum and then by still further recrystallizations from pyridine. Such a batch process does not lend itself satisfactorily to economical commercial production techniques since it requires long reaction periods under vacuum followed by repeated recrystallization. Furthermore, large, hard chunks of crystalline material are obtained as a product of the esterification portion of the process. These are difficult to remove from the reaction vessel and are difficult to dissolve without crushing. Such massive solidification of the reaction mixture makes the water of reaction formed in the esterification extremely difficult to remove and necessarily results in a low yield of triethanolamine borate product.

The object of the present invention is to provide for the preparation of triethanolamine borate of excellent purity and in high yields by reacting boric acid with triethanolamine in the presence of a two-liquid solvent system.

Another object of the invention is the provision of a method for the preparation of triethanolamine borate by heating boric acid and triethanolamine in the presence of a liquid which is a solvent for the reactants and another liquid which is a solvent both for the reactants and the product.

Other and further objects of the invention will, in part, be obvious and will, in part, appear hereinafter.

Broadly, in the attainment of the foregoing objects and in accordance with the present invention, there is provided a process for preparing triethanolamine borate which comprises admixing and heating boric acid and triethanolamine in the presence of a two-liquid solvent system, one of the liquids being a solvent for the reactants only and the other liquid being a solvent both for the reactants and the product, heating the reactants to remove the water formed in the reaction, and recovering relatively pure crystals of triethanolamine borate from the reaction mixture.

More specifically, in the process of preparing triethanolamine borate in accordance with this invention, boric acid and triethanolamine are reacted in a two-liquid solvent system. The liquids employed each are immiscible with water but are miscible with one another. One of the liquids is a solvent both for the boric acid-triethanolamine reactants and the triethanolamine borate product and the other liquid is a selective solvent for the boric acid-triethanolamine reactants alone. The reactants are agitated thoroughly in the presence of the two-liquid solvent system while initially heating to temperatures within the range of 95° C. to about 125° C. whereby substantially all of the water of reaction formed is removed from the reaction zone before substantially any of the two solvents is removed. As heating continues, the water of reaction which is formed vaporizes from the reaction zone. Thereafter, the temperature is increased further up to about 170° C., and consequently a substantial portion of the solvents, in which any unreacted starting materials and associated impurities are dissolved, likewise are vaporized from the reaction zone leaving a mass of discrete, individual crystals of triethanolamine borate. The mass of crystals is removed from the reaction vessel while hot and washed once or twice with a 1:1, by volume, mixture of n-butanol and acetonitrile.

Substantially all of the triethanolamine borate product obtained through the practice of the process of this invention is a simple ester of boric acid and triethanolamine. The product is not a polymer. This is surprising in view of the fact that boric acid and triethanolamine each are trifunctional materials. It would be expected that the product of these two trifunctional materials would be polymeric in nature except when reacted under carefully controlled conditions.

In preparing the two-liquid solvent for use in accordance with this invention there is used as the liquid which is a solvent for the reactants and products, a water immiscible, aliphatic monohydric alcohol having from 4 to 8 carbon atoms per molecule and a boiling point below 200° C. Suitable examples of such alcohols include n-butanol, pentanol, hexanol, 2-ethylhexanol, heptanol, n-octanol and cyclohexanol. The liquid which serves as a selective solvent for the reactants only is a water immiscible hydrocarbon, examples of which include xylene, toluene and benzene. It will be understood, of course, that both liquids forming the solvent system of this invention are miscible in all proportions with one another. Preferred liquids employed as the solvent system are n-butanol and xylene, inasmuch as it has been determined that a high yield of product of excellent purity is obtained when these two liquids are used.

The presence of both liquid solvents is essential to the satisfactory operation of the process of this invention. The hydrocarbon solvent, for example, xylene serves to increase the yield of the product by preventing solidification of the reaction mixture. As the triethanolamine borate forms in the reaction mixture and increases to a quantity beyond that amount which will dissolve in the alcoholic solvent, for example, butanol which is present, crystals of the product begin to come out of solution. The xylene prevents these crystals from sticking to one another and agglomerating, thereby preventing the formation of large chunks of product in the reaction vessel. If the xylene were not present such agglomerates and clumps would form and entrap the water formed in the esterification reaction. Such entrapment would disrupt the equilibrium of the esterification reaction to a point such that the yield of triethanolamine borate product necessarily would be extremely low.

The butanol serves to increase the purity of the triethanolamine product formed since it dissolves the minor quantities of unreacted boric acid-triethanolamine starting materials and associated impurities more readily than does the xylene. When the reaction is carried out in the absence of butanol, a triethanolamine product is obtained which is contaminated with relatively large amounts of these materials. Their removal necessitates repeated recrystallizations from butanol.

The mass of crystalline product obtained upon the completion of the esterification reaction of this invention preferably is washed with a 1:1 by volume mixture of n-butanol and acetonitrile. The washed crystals then are dried at a temperature within the range of from 135° C. to 150° C. to give a pure white crystalline product.

The amounts of the various ingredients employed in practicing the process of this invention are critical to obtain a high yield of pure product. It has been determined that the boric acid and triethanolamine should be employed in a 1:1 ratio, on a molar basis. A larger proportion of boric acid, if used, will result in the final product being contaminated with the excess thereby lowering the yield of pure product. If an excess of triethanolamine is used the product will be dark in color. The two liquids forming the solvent system employed in this invention may be used in amounts varying from 10 mols hydrocarbon:1 mol of alcohol to 7 mols of alcohol:1 mol of hydrocarbon. Excellent results have been obtained using about 4.5 mols of alcohol:1 mol of hydrocarbon.

To indicate more fully the advantages and capabilities of the process of the present invention, the following specific examples are set forth:

*Example I*

The following materials were charged into a three-neck, five-liter flask fitted with a thermometer, stirrer and Dean-Stark trap with condenser. The Dean-Stark trap served to return the two-liquid solvent mixture continuously to the reaction flask. The reactants were protected from outside water and carbon dioxide by a drying tube packed with calcium chloride and pieces of asbestos impregnated with sodium hydroxide.

|  | Grams |
|---|---|
| Triethanolamine (98%) | 1824 |
| Boric acid | 742 |
| n-Butanol | 924 |
| Xylene | 200 |

The reactants were admixed thoroughly and heated slowly, distillation beginning at a temperature of about 99° C. After about 1½ hours the temperature had risen to 103° C. and a total of 227.5 grams of water distillate had been collected. At the end of an additional 1½ hours 218 grams of water distillate had been collected and the flask temperature had reached 109° C. After still another 1½ hours of refluxing 125 grams of water distillate had been collected and the temperature had reached 116° C. At this point crystals began to form and heating was continued for another hour at a temperature between 113° to 115° C. The water distillate then totalled 638.5 grams. The stopclock on the Dean-Stark trap then was opened and about 900 milliliters (728 grams) of solvent distillate was recovered while the flask temperature rose to about 118° C. While still quite hot the reaction mixture containing a minor amount of fluid and a relatively large quantity of white crystals was filtered rapidly, after which the crystalline mass was washed with 3,000 milliliters of a 1:1 by volume mixture of butanol and acetonitrile. The washed product then was dried at a temperature of 150° C. for three hours to yield a total of 1,308 grams of white crystalline triethanolamine borate product having a melting point of 234° C. to 236° C.

*Example II*

Triethanolamine borate was prepared by reacting the following ingredients in apparatus similar to that described in Example I:

|  | Grams |
|---|---|
| Triethanolamine (98%) | 304 |
| Boric acid C. P. | 123.7 |
| N-butanol | 154 |
| Aliphatic petroleum naphtha | 31 |

(Boiling range 200°–300° F., K. B. 38–40, aniline point 121° F.)

The reaction temperature rose to 131° C. and the hot crystals collected at the end of the esterification reaction were filtered and washed once with a 1:1 by volume mixture of n-butanol and acetonitrile. The volume of the wash in milliliters was approximately equal to the weight of the product in grams. The white crystals were filtered and dried for four hours at 150° C. The melting point of the product was 243° C. to 245° C.

*Example III*

Triethanolamine borate was prepared by reacting the following ingredients in apparatus according to the procedure described in Example I.

|  | Grams |
|---|---|
| Triethanolamine (98%) | 304 |
| Boric acid | 123.7 |
| Cyclohexyl alcohol | 154 |
| Xylene | 31 |

The reaction temperature rose to 170° C. over a period of 2¼ hours and the product obtained, on washing with a 1:1 by volume mixture of n-butanol and acetonitrile, was a white crystalline product having a melting point of 243° C.–245° C.

While the present invention has been described with reference to particular embodiments thereof, it will be understood, of course, that certain substitutions, modifications and changes may be made therein without departing from its true scope.

We claim as our invention:

1. A process for preparing triethanolamine borate which comprises admixing and heating boric acid and triethanolamine in the presence of a two-liquid solvent system, one of the liquids being a solvent for the reactants and the other liquid being a solvent both for the reactants and the product, the liquid solvents being immiscible with water and miscible with one another and the liquid which is a solvent for the reactants being a hydrocarbon and the liquid which is a solvent both for the reactants and the product being at least one saturated monohydric alcohol selected from the group consisting of cycloalkyl and alkyl alcohols having from 4 to 8 carbon atoms per molecule, said solvents being employed in amounts of from 10 mols hydrocarbon:1 mol of alcohol to 7 mols alcohol:1 mol hydrocarbon, heating the reactants at temperatures up to about 170° C. to remove the water formed in the reaction and substantially all the liquid solvents, and recovering crystals of triethanolamine borate from the reaction mixture.

2. A process as set forth in claim 1 wherein the reactants and the solvents are heated in such manner whereby substantially all the water of reaction formed is removed before substantially any of the solvent for the reactants and the product is removed.

3. A process as set forth in claim 1 wherein the liquid which is a solvent for both the reactants and the product is n-butanol.

4. A process as set forth in claim 1 wherein the liquid which is a solvent for the reactants alone is xylene.

5. A process as set forth in claim 1 wherein the triethanolamine borate crystals are washed with a 1:1 by volume mixture of n-butanol and acetonitrile.

6. A process as set forth in claim 1 wherein the reaction is carried out at temperatures within the range of from about 95° C. to about 170° C.

7. In the process of preparing triethanolamine borate from boric acid and triethanolamine the improvement which comprises establishing a two-liquid solvent system, one of the liquids being a solvent for the boric acid and triethanolamine and the other liquid being a solvent for the boric acid, triethanolamine, and the triethanolamine borate, the liquid solvents being immiscible with water and miscible with one another and the liquid which is a solvent for the boric acid and triethanolamine being a hydrocarbon and the liquid which is a solvent both for the boric acid and triethanolamine reactants and the triethanolamine borate product being at least one saturated monohydric alcohol selected from the group consisting of cycloalkyl and alkyl alcohols having from 4 to 8 carbon atoms per molecule, said solvents being employed in amounts of from 10 mols hydrocarbon:1 mol of alcohol to 7 mols alcohol:1 mol hydrocarbon, introducing the boric acid and triethanolamine into the two-liquid solvent system while heating the same at temperatures up to about 170° C. to drive off the water formed in the reaction, and recovering substantially pure triethanolamine borate from the reaction mixture.

No references cited.